(12) United States Patent
Hayes

(10) Patent No.: US 7,108,455 B1
(45) Date of Patent: Sep. 19, 2006

(54) CARBURETED BIOVENTING FOR ENHANCED CONTROL OF IN-SITU BIOREMEDIATION

(75) Inventor: Thomas D. Hayes, Schaumburg, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 11/125,674

(22) Filed: May 10, 2005

(51) Int. Cl.
*B09B 1/00* (2006.01)
(52) U.S. Cl. .............................. 405/128.75; 405/128.5; 435/262.5; 210/747
(58) Field of Classification Search ............. 405/128.1, 405/128.75, 128.5; 210/747; 435/262.5
See application file for complete search history.

(56) References Cited

U.S. PATENT DOCUMENTS

| | | | |
|---|---|---|---|
| 5,263,795 A * | 11/1993 | Corey et al. ........... | 405/128.25 |
| 5,584,605 A * | 12/1996 | Beard et al. ............. | 405/128.3 |
| 5,906,932 A * | 5/1999 | Kuriyama et al. ....... | 435/262.5 |
| 6,110,372 A * | 8/2000 | Perriello ..................... | 210/747 |

OTHER PUBLICATIONS

Legrand, R. et al., "Field Application of In Situ Methanotrophic Treatment for TCE Remediation", *Bioremediation and Phytoremediation: Chlorinated and Recalcitrant Compounds*, ed. G.B. Wickramanayake et al., Battelle Press, Columbus, OH, pp. 193-198, 1998.

Reddy, K.R. et al., "A Review of In-Situ Air Sparging for the Remediation of VOC-Contaminated Saturated Soils and Ground-water," Hazardous Waste & Hazardous Materials, vol. 12, No. 2, pp. 97-118 (1995).

Schwarzenbach, R. P. et al., *Environmental Organic Chemistry*, John Wiley & Sons, Inc., pp. 109-123 (1993).

* cited by examiner

*Primary Examiner*—John Kreck
(74) *Attorney, Agent, or Firm*—Mark E. Fejer

(57) ABSTRACT

A method for removing volatile and semi-volatile contaminants from groundwater in which the contaminants are stripped from the groundwater by sparging with an inert carrier gas and the stripped contaminants are transported into a bioactive zone into which at least one gaseous oxidant and at least one nutrient are independently injected, thereby stimulating at least one microbial culture associated with the bioactive zone to remove the stripped contaminants from the bioactive zone. By decoupling the sparging of the groundwater from the introduction of oxidants and nutrient feed gases into the bioventing bioactive zone of the subsurface, the oxygen and nutrient inputs to the bioactive zone can be adjusted (or carbureted) and controlled independently from the hydrocarbon input to the bioactive zone to achieve good kinetic performance in the bioactive zone while avoiding the problems of plugging of groundwater sparging due to biofilm and precipitate formation.

21 Claims, 1 Drawing Sheet

CARBURETED BIOVENTING FOR ENHANCED CONTROL OF IN-SITU BIOREMEDIATION

BACKGROUND OF THE INVENTION

1. Field of the Invention

This invention relates to a method for removing volatile and semi-volatile contaminants from groundwater and soils in the subsurface of contaminated sites. More particularly, this invention relates to the use of biosparging and bioventing for removing volatile and semi-volatile contaminants from groundwater and soils in the subsurface of contaminated sites.

2. Description of Related Art

Biosparging and bioventing are commonly used to remove volatile and semi-volatile contaminants from groundwater and soils in the subsurface of contaminated sites. The conventional mode of treatment involves the introduction of air into the groundwater, a process referred to as biosparging, to partition the volatile/semi-volatile contaminants into the gas phase consistent with Henry's Law relationships, followed by the removal of the contaminants from the gas phase (air stream) through the biodegradative action of microbial films growing in the unsaturated zone of the soil, a process referred to as bioventing.

In many cases where biosparging is applied, the presence of iron in the groundwater as low as 10 mg per liter can cause serious plugging of the air injection system. This problem arises through the reaction of the oxygen in the air with the soluble iron in the water to form insoluble iron oxide precipitates in accordance with the following equations:

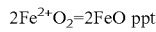

$$2Fe^{2+} O_2 = 2FeO \text{ ppt}$$

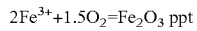

$$2Fe^{3+} + 1.5 O_2 = Fe_2O_3 \text{ ppt}$$

When groundwater iron is at levels above 10 ppm, substantial precipitates form at the natural ranges of groundwater pH (pH 6.5 to 8). These precipitates clog the injection points and pore spaces within the soil particles at locations proximal to the injection points. Plugging can occur within two weeks of start up of biosparging, causing airflows to be reduced by 50 to 90%, reducing the aeration zone of influence (for contaminant removal via air stripping) by more than 80% and causing system shutdown. This problem can potentially occur with any mode of in-situ biological treatment that involves the injection of substantial flows of air or oxygen into the groundwater. Examples of biological treatment modes where plugging problems can occur include aerobic heterotrophic treatment and methanotrophic treatment. Plugging can be severe to the extent that the biosparging/bioventing treatment for a site has to be abandoned for more costly treatment approaches, such as a groundwater pump-and-treat mode of remediation using a packed bed air stripping unit coupled to a granulated activated carbon adsorption process.

A secondary problem with conventional biosparging and bioventing treatment arises from the lack of independent control of the amount of oxidants and nutrients per pound of contaminant that are passed through the bioactive zone (the bioventing zone) of the unsaturated soil stratum. In conventional bioventing, the airflow is usually designed for the effective air stripping of the volatile and semi-volatile compounds from the groundwater. When treating concentrated groundwater contaminant source areas during the initial phase of air sparging, elevated concentrations of the contaminants may be transported to the gas phase and swept with the air stream into the bioventing zone, producing a situation where insufficient oxygen is available for the degradation of the contaminants.

A tertiary problem that occurs with conventional biosparging and bioventing treatments is that when air is used for stripping the groundwater, the oxygen stimulates aerobic bacteria in the groundwater to oxidize the hydrocarbon contaminants to form carbon dioxide and cell mass. When this happens, up to 0.5 pounds of cell mass per pound of contaminant oxidized may be formed, which can clog air injection points and the pores of the groundwater formation itself.

Similar conditions may occur with respect to the introduction of nutrient gases into the air stream used for contaminant stripping from the groundwater. If nutrient gases, such as nitrous oxide or triethylphosphate (TEP) are sparged with the air into the groundwater, most of the nutrients can be solubilized into the groundwater and not follow the air stream into the bioventing zone. In addition, with an initial phase of air sparging, the presence of high concentrations of hydrocarbons that are moved into the bioventing zone with the air may overwhelm the availability of nutrients required for biodegradation.

SUMMARY OF THE INVENTION

Accordingly, it is one object of this invention to provide a method for removing volatile and semi-volatile contaminants from groundwater which avoids the iron and bacterial cell mass plugging problems encountered with conventional air-based biosparging.

It is another object of this invention to provide a method for removing volatile and semi-volatile contaminants from groundwater which provides improved kinetic control over conventional biosparging/bioventing systems.

These and other objects of this invention are addressed by a method for removing volatile and semi-volatile contaminants from contaminated groundwater and soils in a subsurface of contaminated sites which provides independent control of the process of sparging groundwater for the purpose of removing volatile and semi-volatile contaminants from the groundwater and into a carrier gas followed by the stimulation of a bioactive zone in the vadose to remove the contaminants from the carrier gas. More particularly, these and other objects of this invention are addressed by a method for removing volatile and semi-volatile contaminants from groundwater in which the gas phase stripping of contaminants from the groundwater is decoupled from the introduction of oxidants and nutrient feed gases into the bioventing bioactive zone of the subsurface. In this manner, the oxygen and nutrient inputs to the bioactive zone can be adjusted (or carbureted) and controlled independently from the contaminant input to the bioactive zone to achieve good kinetic performance in the bioactive zone.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
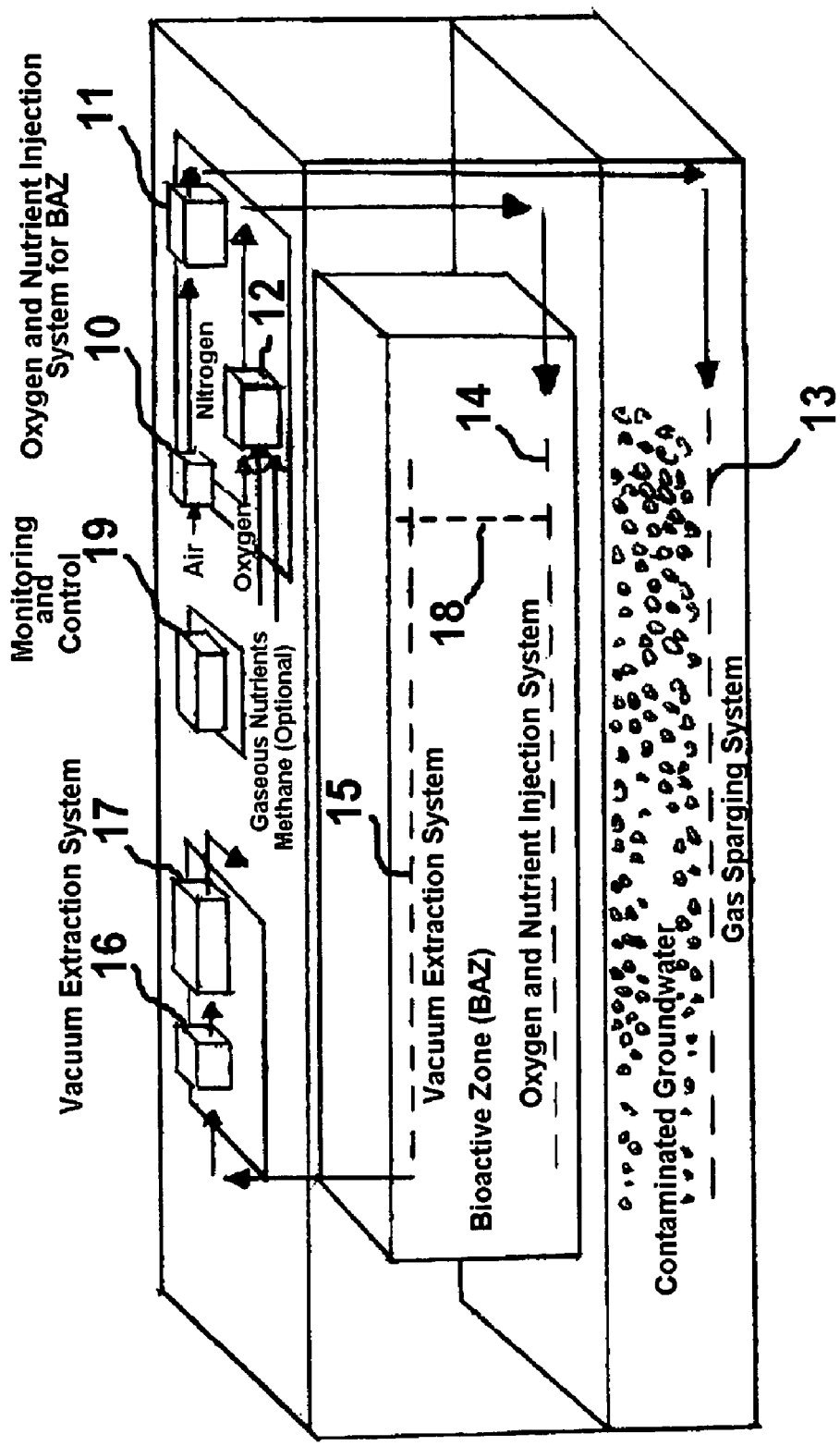
FIG. 1 is a diagram showing the basic features of the method of this invention.

The invention disclosed herein is a method for removing volatile and semi-volatile contaminants, such as benzene, toluene, ethylbenzene and xylenes (BTEX) and chlorinated hydrocarbons including trichloroethylene (TCE), dichloroethylene (DCE) and vinyl chloride (VC), from contaminated groundwater and soils in a subsurface of contaminated sites in which the initial step is the injection of a substantially inert carrier gas which is substantially devoid of oxygen into the contaminated groundwater, as a result of which at least a portion of the contaminants present therein are stripped from the groundwater and carried away by the inert carrier gas. As used in the description and claims herein, the term "substantially devoid of oxygen" refers to a concentration of oxygen in the inert carrier gas of less than about 3% by volume, which is the amount deemed necessary to avoid high rates of iron oxide formation. If maintenance of oxidation reduction potential above some value, e.g. −100 mv, is necessary to avoid undesirable transformations in the subsurface, it may be desirable to use oxygen levels in the range of about 1–2 percent by volume in the substantially inert carrier gas to prevent the groundwater from becoming highly anoxic. In accordance with one preferred embodiment of this invention, the substantially inert carrier gas is selected from the group consisting of nitrogen, helium and mixtures thereof.

After stripping of the contaminants from the groundwater, the contaminant-containing inert carrier gas is passed into a bioactive zone of an unsaturated subsurface, which bioactive zone is disposed above the groundwater. Then, independently of each other, at least one gaseous oxidant and at least one nutrient are injected into the bioactive zone, stimulating at least one microbial culture associated with the bioactive zone to remove the stripped contaminants from the contaminant-containing inert carrier gas. The at least one oxidant is preferably selected from the group consisting of oxygen, oxygen-enriched air, ozone and combinations thereof. In accordance with one preferred embodiment of this invention, the at least one nutrient is selected from a nutrient group consisting of nitrogen compounds, phosphate compounds and combinations thereof. In accordance with one particularly preferred embodiment of this invention, the at least one nutrient is selected from the group consisting of ammonia, nitrates, nitrites, orthophosphates, triethylphosphate, nitrous oxide, gaseous peroxide and combinations thereof.

To carry out the method of this invention, several systems as discussed herein below are employed. The first of these systems is an inert gas production and/or storage system by which the substantially inert carrier gas is provided to the contaminated groundwater. It will be apparent to those skilled in the art that there exist numerous sources for inert carrier gases. However, the most economical and, indeed, the most preferred system for delivery of the inert carrier gas to the contaminated groundwater comprises a molecular sieve air separation system 10 as shown in FIG. 1, which is generally capable of generating greater than 99% nitrogen at costs less than 1 cent per pound (assuming electricity costs of 10 cents/KWH) with the concomitant production of an oxygen stream containing 96% oxygen. The nitrogen stream is injected by means of a nitrogen compression and flow metering system 11 into groundwater sparging wells. The high grade oxygen stream from the same air separation process is injected by means of an oxygen and nutrient injection system 12 in which blended oxygen and gaseous nutrients are compressed and the mixture injected into the bioactive zone (BAZ).

The second of these systems is the groundwater sparging system 13, which comprises compressors and gas injection wells that are placed at strategic locations in the groundwater to effect an efficient stripping of the contaminants from the ground water using the nitrogen or other inert carrier gas stream. Horizontal and/or vertical gas injection wells may be employed.

The third of these systems is the bioactive zone (BAZ) nutrient delivery system 14, which system comprises one or more injection wells that deliver liquid and slow release nutrients as well as gaseous oxidants and gaseous nutrients, including nitrogen, phosphorous and supplemental hydrocarbon feedstocks, placed at strategic locations in the BAZ to stimulate microbial film activity. Horizontal and/or vertical injection wells may be employed.

The fourth of these systems is the vacuum extraction system 15, which comprises one or more horizontal and/or vertical vacuum extraction wells disposed in the upper portion of the bioactive zone to achieve efficient capture of all gases passing through the bioactive zone. Gases are extracted from the bioactive zone by means of compressors and vacuum pumps 16. This system further comprises a GAC (granular activated carbon) adsorption system 17 through which all gases collected from the bioactive zone are passed to ensure capture of all contaminants.

In accordance with one embodiment of this invention, the bioactive zone is heated by heat delivery systems, which include conductive heating through the use of heating elements placed into metal well casings, resistance heating, microwave heating, or heated oxidant gases. The modest and independent heating of the bioactive zone stimulates the kinetics of removal of contaminants from the carrier gas. In accordance with one preferred embodiment of this invention, the bioactive zone is heated to a temperature in the range of about 30° C. to about 60° C.

The method of this invention may be operated in either an aerobic heterotrophic mode in which the oxygen is injected into the bioactive zone, as air, oxygen-enriched air, pure oxygen and/or ozone or in a methanotrophic mode in which methane is injected with the oxygen into the bioactive zone. In the aerobic heterotrophic mode, injection rates of oxygen are calculated on the basis of the loading rate of contaminants to the bioactive zone, which will begin at an elevated level and decrease over time as the gas stripping of the groundwater progresses and contaminant levels in the groundwater decrease. Oxygen flow rates to the bioactive zone in accordance with the method of this invention are preferably in the range of about 2 to about 10 times the stoichiometric oxygen equivalent of the total hydrocarbon input to the bioactive zone. In the methanotrophic mode, methane is introduced into the oxygen-containing stream at concentration levels in the range of about 0.5 to about 4% by volume. Nutrient addition may consist of liquid injection of nitrogen or phosphorous nutrient in the form of ammonia, nitrate, nitrite, orthophosphate or gaseous stream injection for the introduction of triethylphosphate and/or nitrous oxide. Introducing the nutrients into the bioactive zone rather than into the groundwater, as is conventionally done, substantially reduces the losses of nutrients that occur as the result of solubilization of the nutrients into the groundwater. In accordance with one preferred embodiment of this invention, the nitrogen nutrients are injected into the bioactive zone in an amount corresponding to a nitrogen-to-carbon ratio in the bioactive zone in a range of about 10:1 to about 20:1. In accordance with another preferred embodiment of this invention, the phosphate nutrients are injected into the bioactive zone in an amount corresponding to a phosphate-to-carbon ratio in the bioactive zone in a range of about 20:1 to about 40:1.

Example I

In this example, the method in accordance with one embodiment of this invention is applied to a 0.2 acre site containing 3,000 ppb (parts per billion) of BTEX in the groundwater. About 20 to 40 scfm (standard cubic feet per minute) of nitrogen from an air separation unit is sparged into the groundwater to strip BTEX from the groundwater into the nitrogen carrier gas after which the BTEX-containing carrier gas is passed into the bioactive zone. Oxygen from the air separation unit is combined with air at a total flow of about 100 scfm and with nutrient gases including triethylphosphate (TEP) and nitrous oxide. The resulting mixture is injected into the bioactive zone in a distribution system comprising horizontal and/or vertical wells placed in the bottom quarter of the bioactive zone. Microbial films present in the bioactive zone are stimulated by the presence of the nutrients and oxygen to remove the BTEX from the carrier gas stream. In this step, oxygen is used by microorganisms to oxidize organic contaminants to carbon dioxide. All gases flowing through the bioactive zone are collected in the vacuum extraction system and passed through a granular activated carbon process before being released to the atmosphere. Every 6–24 hours, all gas flows to the groundwater sparging system and the bioactive zone are terminated and oxygen depletion measurements are taken in gas phase piezometers located throughout the bioactive zone to measure the overall rate of hydrocarbon oxidation that is occurring in the bioactive zone. A programmable logic controller (PLC) 19 receives readings from oxygen sensors 18 in the bioactive zone at various locations to measure oxygen depletion throughout the bioactive zone as an estimate of microbial activity and as a measure of whether the bioactive zone requires more or less nutrients and oxygen input. A closed loop control is, thus, established between the PLC and the solenoids that regulate the flows of oxidant and nutrient gases into the bioactive zone.

Example II

In this example, a 0.2 acre site containing 3,000 ppb (parts per billion) of trichloroethylene (TCE) in the groundwater is treated in the same manner as the site of Example I except that methane is introduced into the bioactive zone along with the oxygen-enriched air at a highly dilute concentration of about 1.0% by volume, well below the lower explosive limit.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. A method for removing volatile and semi-volatile contaminants from contaminated groundwater and soils in a subsurface of contaminated sites, the method comprising the steps of:

stripping at least a portion of said contaminants from said contaminated groundwater by injecting a substantially inert carrier gas substantially devoid of oxygen into said contaminated groundwater, generating stripped contaminants;

transporting said stripped contaminants into a bioactive zone of an unsaturated subsurface positioned above said groundwater; and independently injecting at least one gaseous oxidant and at least one nutrient into said bioactive zone, stimulating at least one microbial culture associated with said bioactive zone to remove said stripped contaminants from said bioactive zone.

2. A method in accordance with claim 1, wherein said substantially inert carrier gas is selected from the group consisting of nitrogen, helium and mixtures thereof.

3. A method in accordance with claim 1, wherein said at least one nutrient is selected from a nutrient group consisting of nitrogen compounds, phosphate compounds and combinations thereof.

4. A method in accordance with claim 3, wherein said at least one nutrient is selected from the group consisting of ammonia, nitrates, nitrites, orthophosphate, triethylphosphate, nitrous oxide, gaseous peroxide and combinations thereof.

5. A method in accordance with claim 1, wherein said oxidant is selected from the group consisting of oxygen, oxygen-enriched air, ozone and combinations thereof.

6. A method in accordance with claim 1, wherein said substantially inert carrier gas and said at least one gaseous oxidant are nitrogen and oxygen, respectively, provided by a molecular sieve air separator unit.

7. A method in accordance with claim 1, wherein methane is introduced into said bioactive zone.

8. A method in accordance with claim 7, wherein said methane is introduced into said bioactive zone in an amount corresponding to a concentration in said at least one gaseous oxidant in a range of about 0.5 to about 4 percent by volume.

9. A method in accordance with claim 5, wherein said oxygen is injected into said bioactive zone in an amount corresponding to about 2 to about 10 times a stoichiometric oxygen requirement for conversion of contaminant carbon in said stripped contaminants and said ozone is added in an amount corresponding to about 0.2 to about 4 percent by volume of said oxygen.

10. A method in accordance with claim 3, wherein said nitrogen compounds are injected into said bioactive zone in an amount corresponding to a nitrogen to carbon ratio in a range of about 10:1 to about 20:1.

11. A method in accordance with claim 3, wherein said phosphate compounds are injected into said bioactive zone in an amount corresponding to a phosphorous to carbon ratio in a range of about 20:1 to about 40:1.

12. A method in accordance with claim 1, wherein said bioactive zone is heated to a temperature in a range of about 30° C. to about 60° C.

13. A method in accordance with claim 1, wherein said gases in an upper portion of said bioactive zone are vacuum extracted and passed through a gas phase granular activated carbon adsorption process.

14. A method for removing volatile and semi-volatile contaminants from contaminated groundwater and soils in a subsurface of contaminated sites, the method comprising the steps of:

injecting a substantially inert carrier gas substantially devoid of oxygen into said contaminated groundwater, forming a contaminant carrying inert carrier gas;

passing said contaminant carrying inert carrier gas into a bioactive zone of an unsaturated subsurface disposed above said groundwater;

independently injecting at least one gaseous oxidant and at least one nutrient into said bioactive zone resulting in removal of said contaminants from said contaminant carrying inert carrier gas and said bioactive zone.

15. A method in accordance with claim 14, wherein said substantially inert carrier gas is selected from the group consisting of nitrogen, helium and mixtures thereof.

16. A method in accordance with claim 14, wherein said at least one nutrient is selected from a nutrient group consisting of nitrogen compounds, phosphate compounds and combinations thereof.

17. A method in accordance with claim 16, wherein said at least one nutrient is selected from the group consisting of ammonia, nitrates, nitrites, orthophosphate, triethylphosphate, nitrous oxide, gaseous peroxide and combinations thereof.

18. A method in accordance with claim 14, wherein said oxidant is selected from the group consisting of oxygen, oxygen-enriched air, ozone and combinations thereof.

19. A method in accordance with claim 14, wherein methane is introduced into said bioactive zone.

20. A method in accordance with claim 14, wherein said bioactive zone is heated to a temperature in a range of about 30° C. to about 60° C.

21. A method in accordance with claim 14, wherein said gases in an upper portion of said bioactive zone are vacuum extracted and passed through a gas phase granular activated carbon adsorption process.

* * * * *